(No Model.)
F. PAINE.
TOBACCO PIPE.
No. 580,989. Patented Apr. 20, 1897.
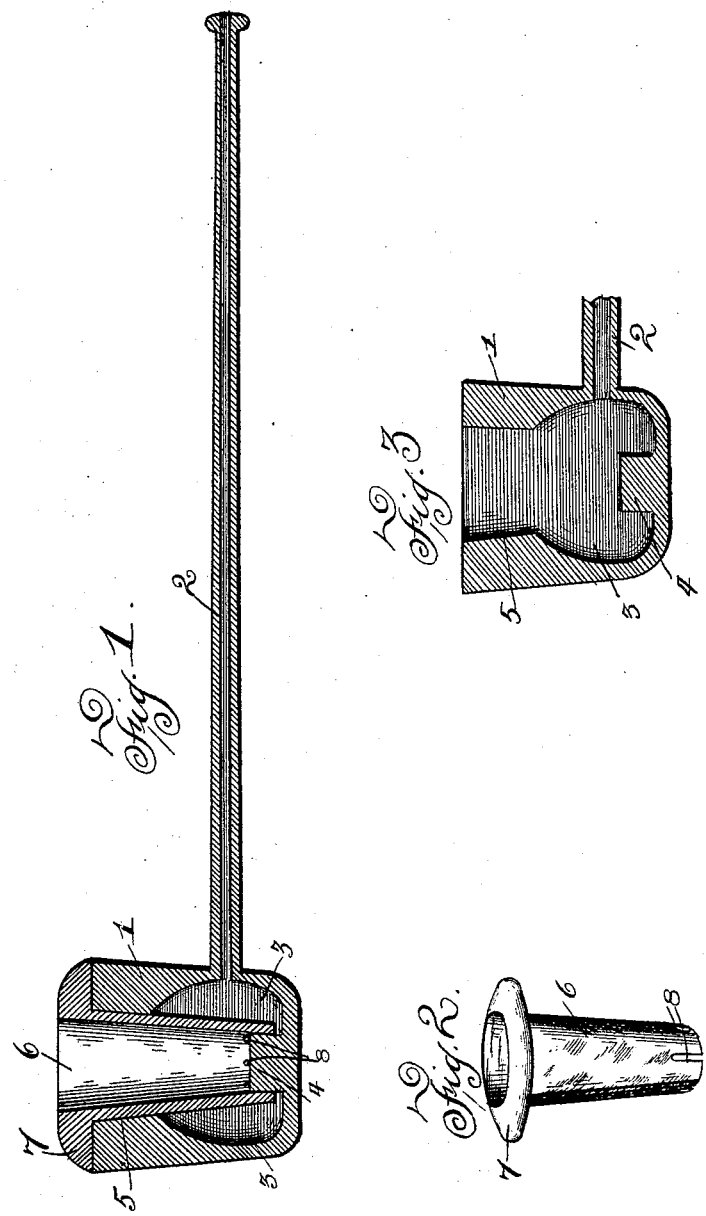
WITNESSES
Jos. Gregory
J. E. Tappan
INVENTOR
Franklin Paine
by John Wedderburn
Attorney

UNITED STATES PATENT OFFICE.

FRANKLIN PAINE, OF DULUTH, MINNESOTA.

TOBACCO-PIPE.

SPECIFICATION forming part of Letters Patent No. 580,989, dated April 20, 1897.

Application filed September 1, 1896. Serial No. 604,581. (No model.)

*To all whom it may concern:*

Be it known that I, FRANKLIN PAINE, a citizen of the United States, residing at Duluth, in the county of St. Louis and State of Minnesota, have invented certain new and useful Improvements in Tobacco-Pipes; and I do hereby declare the following to be a full, clear, and exact description of the invention, such as will enable others skilled in the art to which it appertains to make and use the same.

This invention relates to a novel construction in a smoking-pipe, the object being to provide a pipe that will afford a dry and clean smoke.

In the accompanying drawings, illustrating this invention, Figure 1 is a central longitudinal section, and Figs. 2 and 3 are detail views.

In said drawings, 1 is the bowl of the pipe, and 2 the stem.

The bowl 1 is provided with a chamber 3, communicating with the stem 2, and in the bottom of said chamber is a boss or projection 4. The chamber 3 at its upper end is provided with an outwardly-flaring opening 5. Situated within the bowl is a tobacco-cup 6, having a top flange 7, while the body portion of the cup is adapted to fit tightly within the opening 5 of the bowl. The lower end of the cup 6 is open and fits nicely upon the boss or projection 4, while it is provided with a plurality of notches or openings 8, through which the smoke can pass from the cup to the chamber 3.

In a pipe constructed in this manner all the smoke passes through the chamber 3 on its way to the stem, so that the nicotine settles in the bottom of the chamber, from which it can be removed in an easy manner by simply removing the cup 6. The removable cup 6 also provides a convenient means for cleaning the pipe, since when the cup is removed the entire bowl is exposed.

I claim as my invention—

1. A pipe having a bowl, a projection in the bottom of said bowl, and a removable cup, situated within said bowl and having an open lower end receiving the said projection and communicating with said bowl, substantially as described.

2. A pipe having a bowl, a projection in the bottom of said bowl, a removable cup situated within said bowl and having an open lower end receiving said projection, and openings through the lower end portion of said cup, substantially as described.

3. A pipe having a bowl, a projection in the bottom of said bowl and a removable cup situated within said bowl and having an open lower end receiving the said projection and communicating with said bowl, and a flange upon the upper end of said cup resting upon the upper edge of said bowl.

In testimony whereof I have signed this specification in the presence of two subscribing witnesses.

FRANKLIN PAINE.

Witnesses:
M. J. MULLIN,
C. F. WIBERG.